J. G. Perry.
Sausage Machine.
N° 36,233.      Patented Aug. 19, 1862.
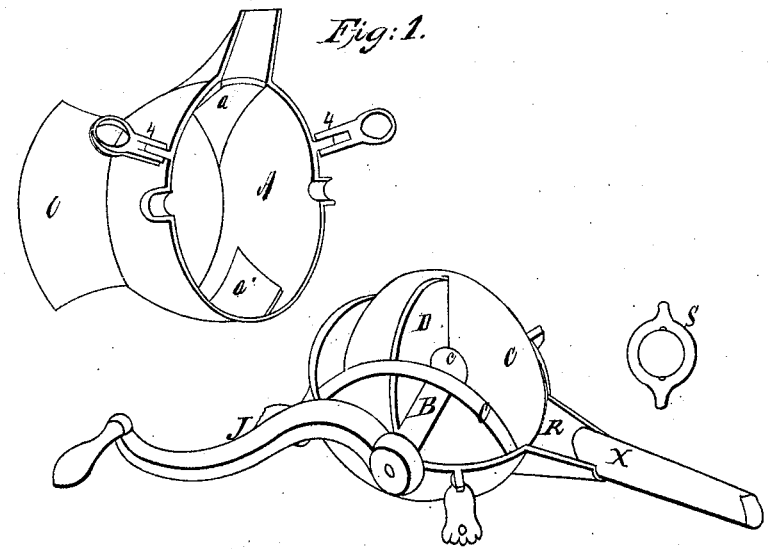
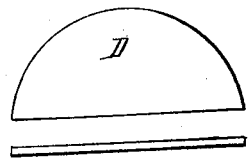
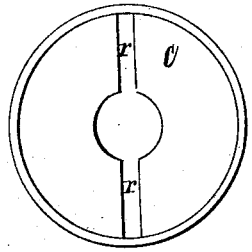
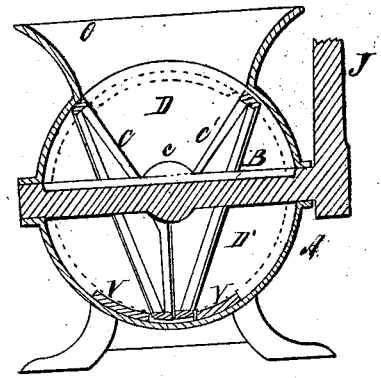
Witnesses:
Wilkin Updike
Asa F. Gardner
Inventor:
John G. Perry

UNITED STATES PATENT OFFICE.

JOHN G. PERRY, OF SOUTH KINGSTON, RHODE ISLAND.

IMPROVED SAUSAGE-FILLER.

Specification forming part of Letters Patent No. 36,233, dated August 19, 1862.

*To all whom it may concern:*

Be it known that I, JOHN G. PERRY, of South Kingston, in the county of Washington, in the State of Rhode Island, have invented a new and Improved Machine for Filling Sausages; and I do hereby declare that the following is a full and correct description thereof, reference being had to the accompanying drawings, and to the letters of reference marked thereon, the same letters being used to denote the same parts in all the figures.

Figure 1 is a perspective view of the machine open, so as to show the arrangement of the inside parts. Fig. 2 is a vertical cross-section taken through the center of the shaft in the direction of its length. Fig. 3 represents one of the disks. Fig. 4 represents one of the leaves.

To construct my improved sausage-filler, a spherical case, A, is made, having a shaft, B, through its center turning in bearings in the sides of the case. This case is divided horizontally through its center into two parts for convenience in arranging the inside parts. The shaft B is provided with two leaves, D D', one of which, D', may be cast in one piece with the shaft or otherwise secured to it, so as to turn with it. The other leaf lies in a groove in a ball, c, made on the middle of the shaft. Two beveled disks, C C', are placed on the shaft, which passes through holes in their centers. Two slots, r, are made in each disk, extending from the hole in the center nearly to the edge of the disk. These are to hold the leaves before mentioned. These two disks are placed in the case in such a position as to bring their lower surfaces together, (after the manner of two bevel gear-wheels,) and are kept so by the two blocks v v', which are secured to the bottom of the case; or a groove may be made in the case for the disks to turn in. As the bottoms of the disks are brought together their tops are necessarily spread apart, and the blocks or projections a a' are placed in the top part of the case to hold them steady in place.

The number of leaves may be increased by making another slot in each disk for each additional leaf, or one of the two leaves may be left out and the machine made with only one. The upper part of the case is spread open to form a hopper to receive the meat, and a spout, R, is made on one side of the lower part, so as to open in between the disks, and is furnished with a nozzle, X, to hold the skins or cases and direct the meat into them. A crank, J, is put on the end of the shaft to turn it by.

The operation is as follows: The disks and leaves being arranged as shown in Fig. 1, the upper part of the case is put on and secured to the lower part by the catches t t, and the ring s is passed on over the two parts of the spout, so as to secure the nozzle X in place. When the crank is turned, the leaf that is fast to the shaft turns the disks around, while they in their turn move the other leaf or leaves, and upon putting the minced meat into the hopper it falls in between the disks and is carried around into the case; but as the disks meet at the bottom the meat can go no farther that way and is obliged by the pressure of the leaves to pass out at the spout and through the nozzle into the skins or cases.

Having thus described my improved sausage-filler, I claim—

The combination of the disks with the leaf or leaves and shaft, substantially as herein described, and for the purposes set forth.

JOHN G. PERRY.

Witnesses:
WILKINS UPDIKE,
ASA F. GARDNER.